US008896262B2

(12) United States Patent
Fracas

(10) Patent No.: US 8,896,262 B2
(45) Date of Patent: Nov. 25, 2014

(54) TRANSPORTABLE ELECTRICITY GENERATION UNIT AND METHOD FOR GENERATING ELECTRICITY USING SAID UNIT

(75) Inventor: Paolo Fracas, Lecco (IT)

(73) Assignee: Gemport S.r.l., Vimercate (MB) (IT)

( * ) Notice: Subject to any disclaimer, the term of this patent is extended or adjusted under 35 U.S.C. 154(b) by 497 days.

(21) Appl. No.: 13/321,560

(22) PCT Filed: May 20, 2010

(86) PCT No.: PCT/EP2010/056998
§ 371 (c)(1),
(2), (4) Date: Nov. 21, 2011

(87) PCT Pub. No.: WO2010/133684
PCT Pub. Date: Nov. 25, 2010

(65) Prior Publication Data
US 2012/0068661 A1    Mar. 22, 2012

(30) Foreign Application Priority Data
May 21, 2009  (IT) .............................. MI2009A0907

(51) Int. Cl.
*H02J 7/00*    (2006.01)
*H01M 16/00*   (2006.01)
(Continued)

(52) U.S. Cl.
CPC ........ *H01M 16/003* (2013.01); *H01M 8/04776* (2013.01); *H01M 8/0494* (2013.01);
(Continued)

(58) Field of Classification Search
CPC ..... Y02E 60/50; Y02E 60/521; Y02E 60/523; Y02E 60/12; H01M 2008/1095; H01M 8/04089; H01M 10/465; H01M 16/006; H02J 7/35; H02J 7/355

USPC ......................................................... 320/101
See application file for complete search history.

(56) References Cited

U.S. PATENT DOCUMENTS 4,326,013 A     4/1982  Jacobi et al.
5,723,086 A *   3/1998  Ledjeff et al. ................. 264/248
(Continued)

FOREIGN PATENT DOCUMENTS

GB      2405742 A    3/2005
JP   2001266923 A    9/2001
(Continued)

*Primary Examiner* — Arun Williams
(74) *Attorney, Agent, or Firm* — Novak Druce Connolly Bove + Quigg LLP

(57) ABSTRACT

This invention relates to a transportable electricity generation unit (30) suitable to supply electric power to an external load (51). Said electricity generation unit (30) comprises: a photovoltaic generation unit (1) and/or an aerogenerator generating a first electric power ($P_1$), a water electrolyzer (4) connected to said photovoltaic generation unit (1) and/or aerogenerator, said electrolyzer being capable of producing hydrogen by electrolysis of water; a tank (3) to store the hydrogen deriving from said electrolysis of water; a fuel cell unit (2) fed with the hydrogen produced by said electrolyzer (4) or stored in said tank (3), said fuel cell (2) generating a second electric power ($P_2$), a battery accumulator unit (5); an electronic power control device (8) comprising means for controlling the flow of said first electric power ($P_1$) and said second and third electric power ($P_2$, $P_3$) to said external load (51), controlling the flow of said first electric power ($P_1$) to said water electrolyzer (4), and for controlling production and storage of hydrogen.

17 Claims, 5 Drawing Sheets

(51) Int. Cl.
*H01M 8/04* (2006.01)
*H01M 8/06* (2006.01)
*H01M 8/18* (2006.01)
*H01M 8/24* (2006.01)

(52) U.S. Cl.
CPC ........ *H01M 8/04947* (2013.01); *H01M 8/0656* (2013.01); *H01M 8/186* (2013.01); *H01M 8/04201* (2013.01); *H01M 8/04216* (2013.01); *H01M 8/065* (2013.01); *H01M 8/2475* (2013.01); *H01M 2250/40* (2013.01); *H01M 2250/402* (2013.01); *Y02B 90/12* (2013.01); *Y02E 60/528* (2013.01); *Y02E 70/20* (2013.01); *Y02E 60/56* (2013.01)
USPC ......................................................... 320/101

(56) References Cited

U.S. PATENT DOCUMENTS

| 2003/0072977 | A1 | 4/2003 | Speranza et al. | |
|---|---|---|---|---|
| 2005/0109393 | A1* | 5/2005 | Anderson | 136/291 |
| 2006/0010850 | A1* | 1/2006 | Jacobson et al. | 60/39.01 |
| 2006/0088739 | A1 | 4/2006 | Ovshinsky | |
| 2006/0260672 | A1 | 11/2006 | Niederer | |
| 2009/0273240 | A1* | 11/2009 | Gurunathan et al. | 307/64 |

FOREIGN PATENT DOCUMENTS

| WO | WO-03008803 A1 | 1/2003 |
|---|---|---|
| WO | WO-2009/002499 A2 | 12/2008 |

* cited by examiner

TRANSPORTABLE ELECTRICITY GENERATION UNIT AND METHOD FOR GENERATING ELECTRICITY USING SAID UNIT

CROSS REFERENCE TO RELATED APPLICATIONS

This application is a National Phase filing under 35 U.S.C. §371 of PCT/EP2010/056998, filed May 20, 2010, which claims priority to Patent Application No. MI2009A000907, filed in Japan on May 21, 2009. The entire contents of each of the above-applications are incorporated herein by reference.

The present invention relates to a transportable electricity generation unit and to a method for generating electricity using said electricity generation unit.

It is known an electricity generation unit comprising a transportable electricity generation apparatus provided with a photovoltaic panel or an aerogenerator with a diesel engine back-up arrangement. The electricity generation apparatus can be transported for example by a cart.

A diesel engine is notoriously a noisy, cumbersome, vibrating and polluting device, which must be periodically filled with diesel fuel that may not always be available.

The back-up of a photovoltaic panel or of an aerogenerator may be required only for a short time, and therefore control logics are usually required to manage operations of the diesel engine.

On days with variable weather, continuous starting/stopping of the diesel engine may occur, which may lead to wear phenomena of the diesel engine.

Further, a diesel engine heats the surrounding environment, which may not be desiderable.

It is also known an electricity generation apparatus comprising a photovoltaic panel or an aerogenerator provided with a battery back-up arrangement.

However, this solution also has some drawbacks.

For example, the charging operations of the batteries may last for a relatively long time, even up to one day.

Further, batteries are components with a high environmental impact and, therefore it would be preferable to reduce their impact, preferably by downsizing the battery of the electricity generation apparatus.

JP 2001 266923 discloses an electric power source device that comprises an electrolyser, a fuel cell, a photovoltaic panel and an aerogenerator. The photovoltaic panel and the aerogenerator are fixed to the ground and are operatively connected to the electrolyser that provides hydrogen, then stored in a portable tanks.

GB 2 405 742 discloses an electric generator comprising a photovoltaic panel and an aerogenerator supplying energy for an electrolyser connected to a fuel cell. This electric generator supplies electric power to a for boat.

U.S. 2005/109393 discloses an electric generator comprising a photovoltaic panel supplying electric energy to an electrolyser connected to a fuel cell. This electric generator supplies electric power to a car.

The present invention aims at overcoming the drawbacks of the prior art, by providing an improved transportable electricity generation unit.

In accordance with the invention, this aim is achieved by a transportable electricity generation unit, suitable to supply electric power to an external load, characterized by comprising:

a photovoltaic generation unit and/or an aerogenerator generating a first electric power;

a water electrolyzer connected to said photovoltaic generation unit and/or aerogenerator, said electrolyzer being capable of producing hydrogen by electrolysis of water;

a tank to store the hydrogen deriving from said electrolysis of water;

a fuel cell unit fed with said hydrogen produced by said electrolyzer or stored in said tank, said fuel cell generating a second electric power, said water electrolyzer and said fuel cell optionally being the same device which operates either as water electrolyzer or as fuel cell;

an electronic power control device comprising means for controlling the flow of said first electric power and said second electric power to said external load, controlling the flow of said first electric power to said water electrolyzer, and for controlling production and storage of hydrogen.

In the present description, the following terms should be considered as having the following meaning:

"transportable electricity generation unit" means a unit that can be moved, for example on wheels;

"portable electricity generation unit" means a unit that can be moved by manual pull, such as a trolley;

"wearable electricity generation unit" means a unit that can be transported by a human like a backpack or the like.

As it is known, an electrolyzer is a device capable of performing electrolysis of water to produce oxygen and hydrogen. This takes place through the input of electric power, in the present case generated by the photovoltaic generation unit and/or an aerogenerator.

A fuel cell unit comprises at least one fuel cell. A fuel cell is capable of producing a reverse reaction of electrolysis performed by the electrolyzer, it being possible to obtain water from hydrogen and oxygen with release of energy, which is provided, in the form of electric power, downstream of the fuel cell unit.

Therefore, the fuel cell unit is itself an electric generator capable of generating electric power from the hydrogen obtained by the electrolyzer and which is stored into a metal hydrate cartridge.

In particular, the fuel cell unit is preferably provided with a polymer membrane type and with two electrodes, one anode and one cathode arranged stacked in a polymer electrolyte. The anode is supplied by hydrogen, which acts as fuel, while the cathode is supplied by oxygen, such as oxygen contained in air.

In a fuel cell, hydrogen atoms are split into protons and electrons so that the protons move through the electrolyte and the electrons generate a direct current capable of supplying the electric load.

In this manner, by using an electrolyser in an appropriate manner to accumulate energy through the storage of hydrogen and by generating this energy through the fuel cell, it is possible to overcome the aforesaid drawbacks of electricity generation units so that the use of diesel motors is not required.

In fact, electrolysis/fuel cell phenomena are generally silent, do not generate vibrations and have a low environmental impact, without harmful emissions.

Moreover, supply fossil fuels becomes unnecessary, as only water is required to produce the chemical-physical phenomena underlying the present invention.

The use of fuel cell overcomes the problem of realising thermal traces.

The electrolyzer, the tank and the fuel cell connected as described form a primary accumulator unit.

Preferably, at least one between fuel cell unit and electrolyser is of polymer membrane type. In fact, it has been noted that this type of component is optimal for the present application in terms of dimensions and weight.

Preferably, a secondary accumulator unit of battery type is provided, electrically connected in parallel to the primary and secondary accumulator unit.

Advantageously, the secondary accumulator unit in this case comprises a battery considerably downsized with respect to a battery according to the prior art, as said battery is not the only storage component but it cooperates with a primary accumulator unit. Said battery is therefore required to store less energy with respect to a corresponding device of the prior art.

Further, in this manner a more fault tolerant behaviour is achieved, as the failure of one of the two accumulator units is replaced, at least partially, by use of the remaining accumulator.

Preferably, a first static DC/DC converter is provided downstream of the photovoltaic generation unit and a second static DC/DC converter downstream of the secondary accumulator unit. In this manner it is possible to exploit the possibilities offered by static conversion of electric energy, in particular by the possibility of setting the direct voltage supplied to the load of the electricity generation unit according to the invention.

Preferably, an enclosure is provided, capable of containing at least the primary accumulator unit, and preferably also the secondary accumulator unit or optionally capable of supporting the photovoltaic generation unit and/or the aerogenerator.

This enclosure is preferably wearable like a backpack to facilitate the transport by a human.

Said enclosure can be a part of a cart provided with wheels to transport the enclosure with the electricity generation unit.

Therefore, it is noted that the electricity generation unit according to the invention is transportable and portable.

The enclosure capable of containing primary accumulator unit, and preferably also the secondary accumulator can also be wearable as a backpack/trolley, providing an ergonomic approach to transportation in long trials.

Preferably, an electronic power control device is provided for controlling the electric power flow.

Preferably, the electricity generation unit can be controlled so as to allow at least the following operating modes:
  a first mode according to which said photovoltaic generation unit and/or said aerogenerator supplies all the first electric power generated to an external load;
  a second mode according to which said photovoltaic generation unit and/or said aerogenerator supplies all the first electric power generated to said external load and said fuel cell and/or said secondary accumulator unit supply the remaining second and/or third electric power to said external load;
  a third mode according to which said photovoltaic generation unit and/or said aerogenerator supply all the first electric power generated directly to said external load and to said water electrolyzer and/or to said secondary battery accumulator unit;
  a fourth mode according to which said fuel cell supplies said second electric power and/or said secondary battery accumulator unit supply said third electric power to said external load
  A fifth mode according to which said fuel cell (2) supplies said second electric power directly to said external load (51) and/or to said secondary battery accumulator load (5)

According to the invention, a method is also provided for generating direct voltage electric power using an electricity generation unit as above, comprising the following steps:
  a first step of generating electric power from photovoltaic and/or wind energy;
  a second step of performing electrolysis using the electric power produced by said first step;
  a third step of storing hydrogen produced during said second step;
  a fourth step of generating further electric power on the basis of a fuel cell type reaction;
  a fifth step of delivering said electric power and/or said further electric power to a load and/or to a secondary battery accumulator unit.
  a sixth step of storing electric energy during fourth step on the basis of a fuel cell type reaction;

Further characteristics and advantages of the present invention will be more apparent from the description of preferred, but not exclusive, embodiments of the present invention, shown by way of example in the accompanying drawings, wherein.

Figure 1:
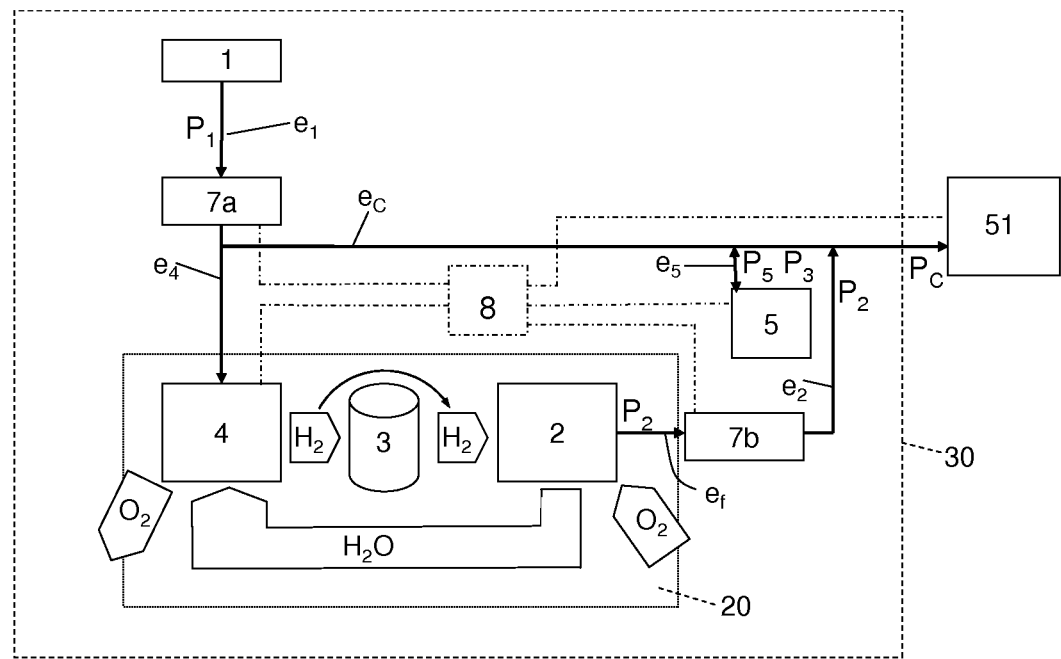
FIG. 1 shows a diagram relative to the flow of electric power provided by the photovoltaic panel, the fuel cell and the secondary battery accumulator to an external load and the connection link to the power control device.
Figure 1A:
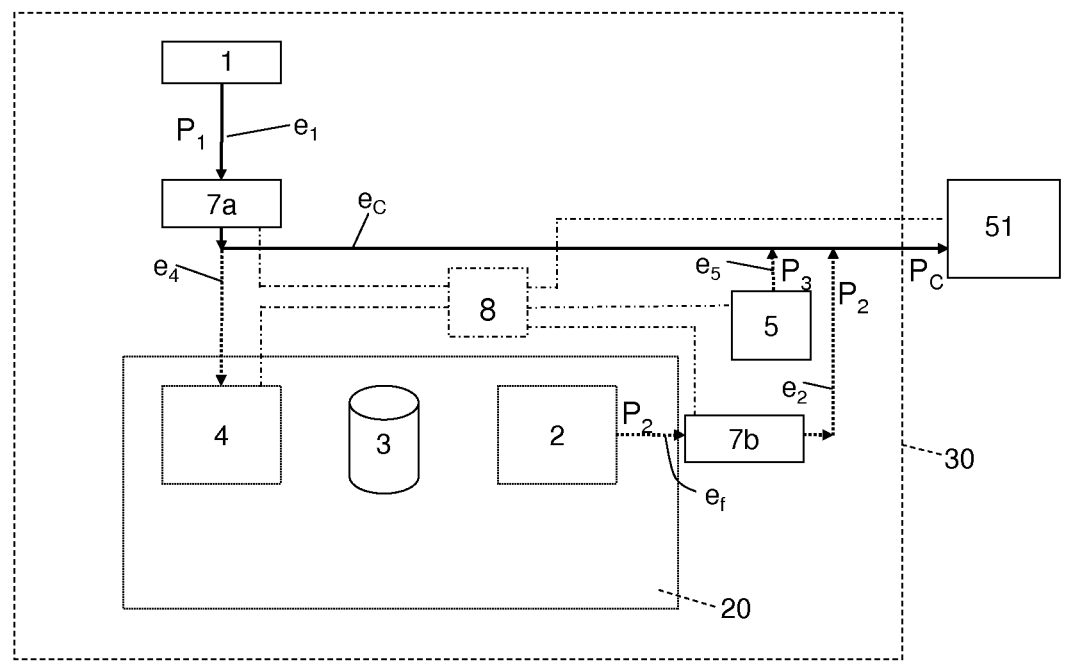
FIG. 1A shows a diagram of the first operating mode of the present invention.
Figure 1B:
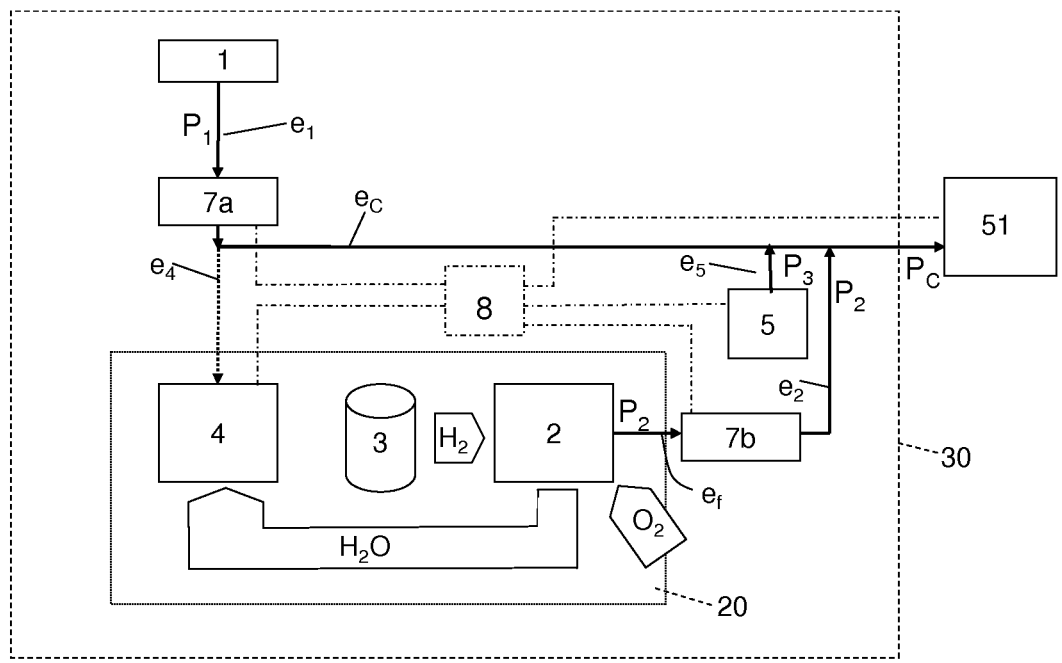
FIG. 1B shows a diagram of the second operating mode of the present invention.
Figure 1C:
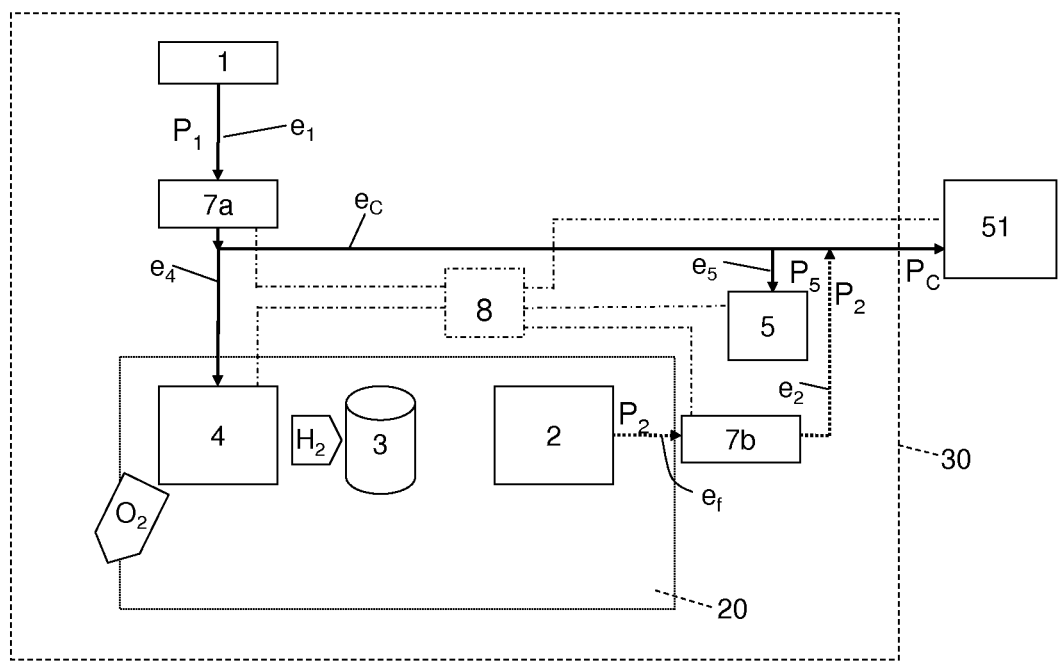
FIG. 1C shows a diagram of the third operating mode of the present invention.
Figure 1D:
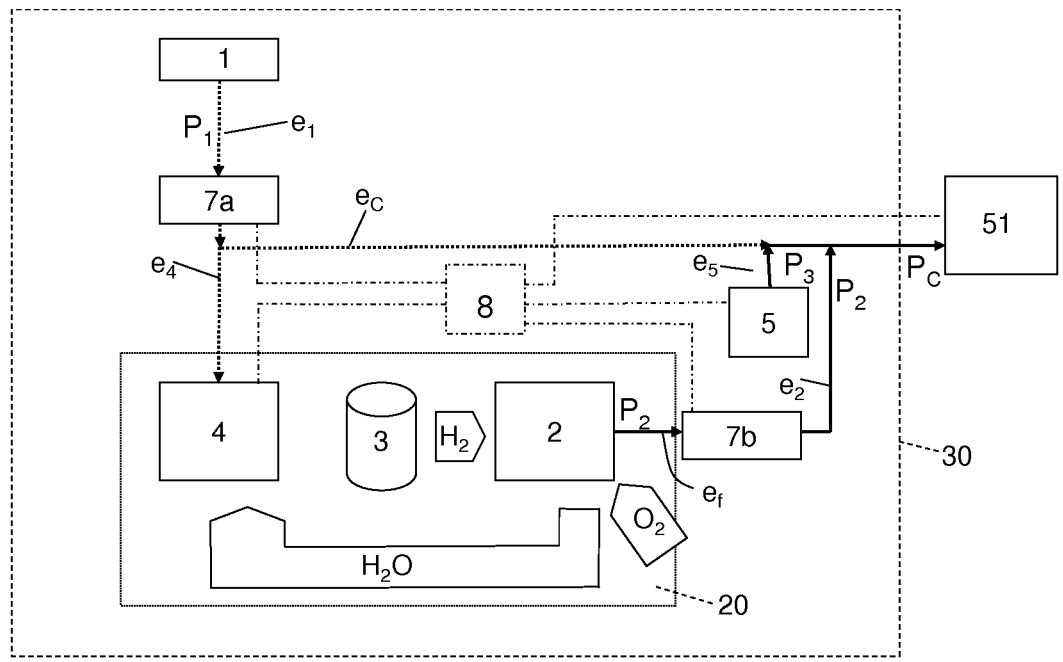
FIG. 1D shows a diagram of the fourth operating mode of the present invention.
Figure 1E:
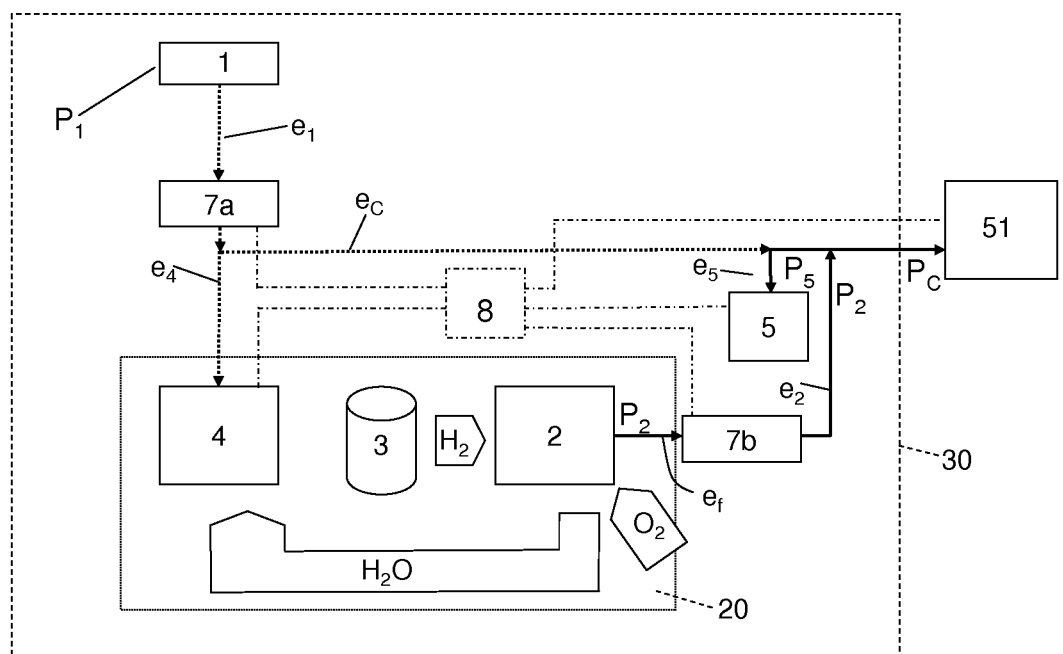
FIG. 1E shows a diagram of the fifth operating mode of the present invention.

With reference to all figures, the number 51 indicates an external load, for example a mobile telecommunication system of radio connection type, for example for use in the field of civil protection for communication in territories not reached by an electric network in emergency situations.

The load 51 is isolated from the electric network and is supplied by an electricity generation unit 30.

According to the present invention, said electricity generation unit 30 comprises an enclosure 60

The chart 10 comprises an enclosure 60, which is capable of containing:
  a primary accumulator unit 20 equipped with electrolyzer 4, with a tank 3 and with a fuel cell unit 2
  a secondary accumulator unit 5 of battery type,
  an electric cabinet comprising the static converters 7a, 7b and the electronic power control device, not shown.

The cart 10 comprises wheels 61 fitted to the enclosure 60, for example of the type known as mini shelter, to allow transport of the cart 10.

The photovoltaic generation unit 1 is of the type with foldable photovoltaic panel in particular of the unfoldable type (although in other embodiments it can be a portable aerogenerator), so that it can be stored in a small space, when not in use.

This photovoltaic panel is also supported by a supporting structure formed by a vertical support 1a (as shows in FIG. 2 where the photovoltaic panel 1 is not complete deployed) which is in turn supported by a horizontal pedestal 1b; according to an alternative to this second embodiment, the vertical support is arranged on the upper part of the enclosure and is equipped with a spatial orientation system adjusted by the electronic power control device or by another control unit.

Said supporting structure can be folded to minimize the space occupied when it is not in use.

Moreover, the cart 10 is provided with supporting means for said supporting structure and said photovoltaic panel, known and therefore not shown, which are capable of supporting this photovoltaic panel and this supporting structure when said electricity generation unit is not operating: in this manner, the photovoltaic generation unit 1 can be associated with the cart 10 and transported with it.

Figure 2:
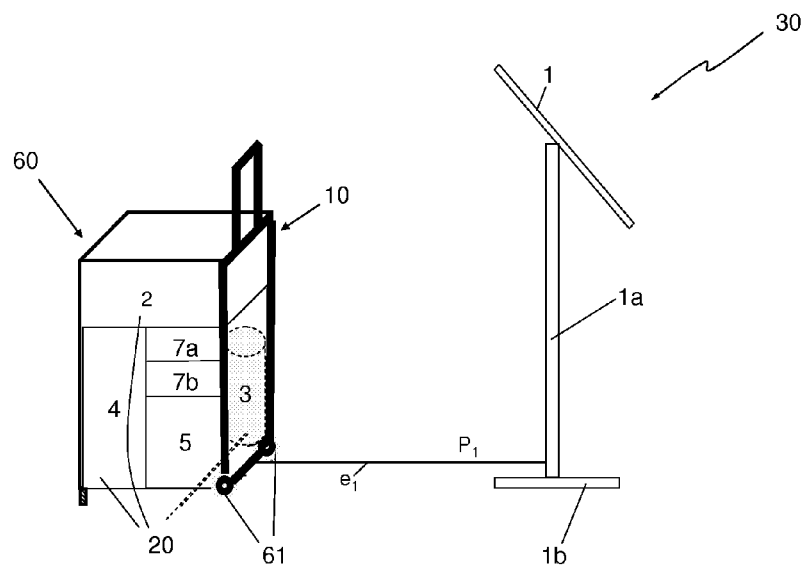
FIG. 2 shows a schematic perspective view of a preferred embodiment of the present invention, where the photovoltaic panel is not complete deployed.
Figure 3A:
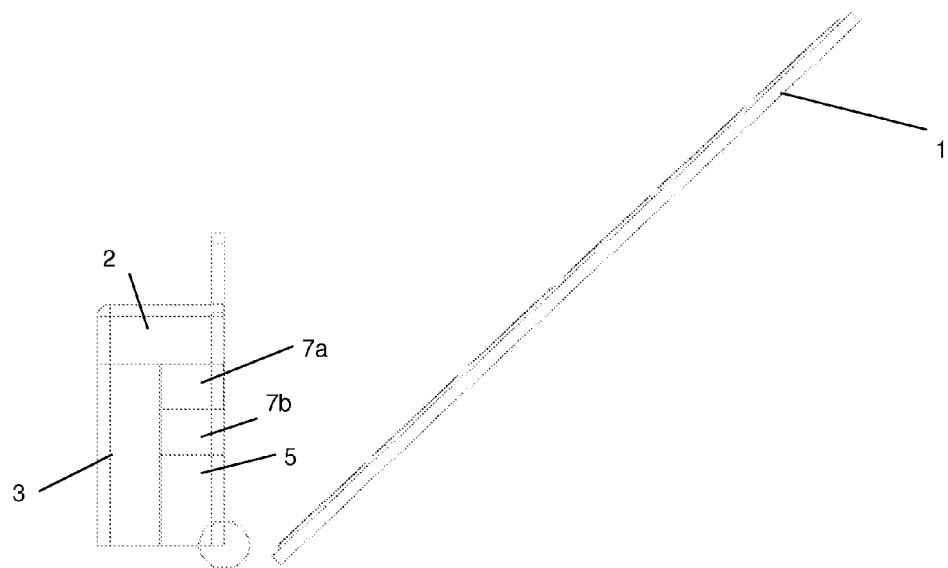
FIG. 3A shows a lateral view of a preferred embodiment of the present invention
Figure 3B:
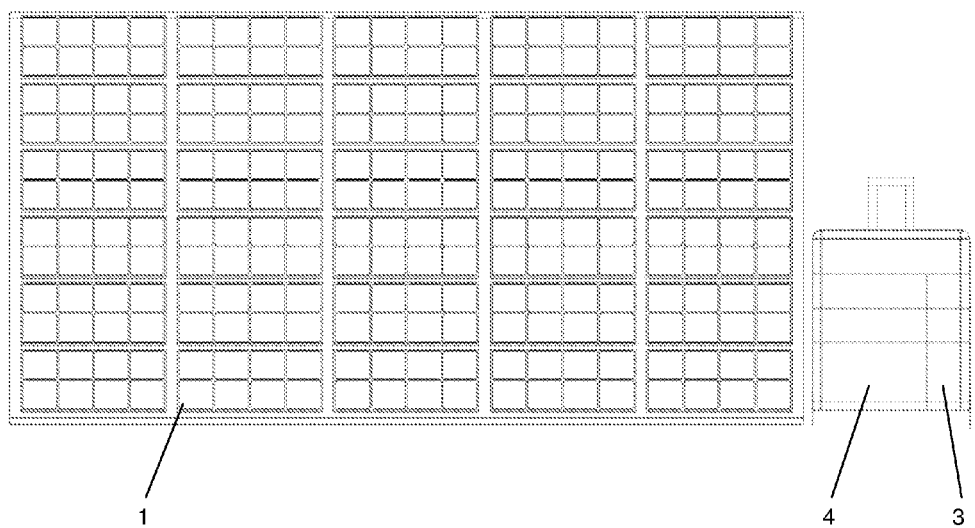
FIG. 3B shows a frontal view of a preferred embodiment of the present invention

FIG. 2 does not show the electric load (which in the previous embodiment was indicated with 51), which is external and can be electrically connected in a known manner.

In fact, it is important to note that the present invention is perfectly suitable both for targeted uses (such as a mobile radio transmission system according to the first embodiment illustrated previously) and for general purpose uses, provided that the external load can be supplied with direct voltage at the suitable power.

It is important to note that the mobile telecommunication system 51 is a non-limiting example of electric load, but could be replaced by another type of load.

It also important to note that said electricity generation unit 30 can be embedded into a wearable backpack/trolley, which allows a more ergonomic transportation.

The load 51 is supplied with a power $P_c$. In the present case, the load is sized to absorb, during its operations, a power $P_c$ included within the range of 50 W-500 W.

Said electricity generation unit 30 comprises a photovoltaic generation unit 1 inserted on said enclosure 60, which may comprise at least one photovoltaic panel and/or an aerogenerator, in particular a portable aerogenerator.

The photovoltaic panel has a radiation receiving surface of 6 m$^2$, but could also have a different surface.

Said electricity generation apparatus 30 comprises a primary accumulator unit 20 of electrolyte/fuel cell type electrically connected in cascade to the photovoltaic generation unit 1.

Said primary accumulator unit 20 is capable of storing and providing energy, in particular of receiving electric power deriving from the first electric power P1 generated by the photovoltaic generation unit 1 and providing second electric power $P_2$.

Between the photovoltaic generation unit 1 and the primary accumulator unit 20 a first converter 7a is interposed, in particular of direct voltage static type, which is capable of providing a set voltage, which can, for example, be a DC voltage of 12 V, 24 V or 48 V. Moreover, the first converter 7a has the task of stabilizing the direct voltage and controlling the efficiency of the photovoltaic power generation unit 1 at highest efficiency level.

The electrolyzer 4 is of polymer membrane type.

Said electrolyzer 4 is capable of absorbing electric power. In the present case, the electrolyzer 4 is dimensioned at 400 W and generates 1 standard liter/minute of Hydrogen, but in other embodiments it could be dimensioned, for example, in a range of 300-800 W, preferably between 450 W-600 W.

The tank 3 is, in this particular case, dimensioned for a pressure of 16 bar but this could also be greater, in particular below 20 bar (1 bar=100000 Pa). The tank 3 has a volumetric capacity of 50 liters (1 liter=1 dm$^3$), but this could also be greater, for example between 50 liters and 150 liters with a capacity from 800 to 2400 standard liters of Hydrogen. In the present embodiment, the tank 3 is made of aluminium, which makes it advantageously light.

In the wearable backpack/trolley version the hydrogen storage is provided with metal hydrides cartridges with internal capacity of 1000 standard liters of Hydrogen.

The fuel cell unit 2 is of polymer membrane type, like PFSA, which has proven to have better performances compared to other known prior art fuel cells, for example phosphoric acid fuel cells, alkaline electrolyte fuel cells (normally used in systems with power greater than one kW), molten carbonate fuel cells, solid oxide fuel cells.

The fuel cell unit 2 generates water which, appropriately distilled, is returned in feedback to the electrolyzer 4. Advantageously, in this manner the use of supplies of water, which is distilled/deionized, is almost unnecessary.

The fuel cell unit 2 is capable of generated second electric power $P_2$.

In the present case, the fuel cell unit 2 is dimensioned at 300 W with peak power of 500 W provided by the internal battery pack, but there could be variants according to which it is dimensioned at 500 with peak power of 700 W.

The fuel cell unit 2 is capable of operating at steady state between 30° C. and 180° C., which is undoubtedly lower than the temperatures produced by the diesel engine.

Moreover, rapid start-up of the fuel cell unit 2 is achieved.

Downstream of the fuel cell unit 2 a second converter 7b is provided, capable of converting the voltage to 12 V or 24 V or 48 V compatibly with the voltage set by the first converter 7a.

Moreover, the second converter 7b is capable of stabilizing the direct voltage.

Advantageously, a secondary accumulator unit 5 of battery type is provided; this secondary accumulator 5 includes a battery of known type (Ion Lithium or Nichel Metal Hydride) that is connected in parallel to the primary accumulator unit 20.

In the present case the battery is of the type dimensioned so as to be chargeable with capacity up to 50 Ah, but it could also be of another size in other embodiments, for example chargeable to 100 Ah (1 h=3600 s).

The secondary accumulator unit 5 is capable of storing electric power $P_5$ derived from said first electric power $P_1$ generated by the photovoltaic generation unit 1 and/or derived from said electric power $P_2$ generated by the fuel cell unit 2. The secondary accumulator unit 5 is also capable of generating a third electric power $P_3$.

An electronic power control device 8 is provided to control the electric power flow from the photovoltaic generation unit 1 to the load 51.

This electronic power control device 8 is of the microprocessor type, for example of the type known as digital signal processor or in any case a process controller.

An alternative embodiment is also provided, according to which this electronic power control device 8 also comprises a digital radio communication device, for example according to the standard GPRS, which allows the condition of the electricity generation unit 30 to be communicated to a fixed control unit and commands to be set remotely by operators not present at the site.

It is noted that the electronic power control device 8 is connected to the following components:
 the static converters 7a and 7b, so as to allow setting of the voltage;
 the secondary accumulator unit 5, so as to check the charge condition of this secondary accumulator unit 5 and the power $P_5$ and $P_3$ exchanged by said secondary accumulator unit 5;

the electrolyzer 4, so as to check the state of said electrolyzer 4, in particular the quantity of hydrogen stored in the tank 3 and the power absorbed by said electrolyzer 4;

the load 51, so as to allow communication between said electronic power control device 8 and the control device 5 of the load 51.

In other embodiments, connection of the electronic power control device 8 to the load 51 could be excluded.

It is noted that the connections, indicated in FIG. 1, 1A, 1B, 1C, 1D by a thin line, between the electronic power control device 8 and the elements 4, 5, 7a, 7b, 51 previously described are control type connections, for example through a digital communication line or in any case for setting commands or signals.

Instead, the connections indicated in FIG. 1, 1A, 1B, 1C, 1D by a thick line are electric power lines, the arrows indicate the direction of the power flow to supply the load 51. In particular, there are noted:

an electric power line $e_1$, downstream of the photovoltaic generation unit 1 and upstream of the static converter 7a, said electric power line $e_1$ being capable of supporting the power $P_1$;

an electric power line $e_C$, downstream of the first static converter 7a and upstream of the load 51, said electric power line $e_C$ being capable of supporting the power $P_C$ that is delivered to the load 51;

an electric power line $e_4$, downstream of the first static converter 7a and branched from the electric power line $e_C$; this electric power line $e_4$ is upstream of the first accumulator unit 20 and in particular of the electrolyzer 4, said electric power line $e_4$ being capable of supporting the power with which the electrolyzer 4 is supplied;

an electric power line $e_f$, downstream of the fuel cell unit 2 and upstream of the second static converter 7b, said electric power line $e_f$ being capable of supporting the power $P_2$ delivered by the fuel cell unit 2;

an electric power line $e_2$, downstream of the second static converter 7b and connected to the electric power line $e_C$, so as to be capable of supplying, at least partly, the load 51, supplying the power $P_2$;

an electric power line $e_5$, interposed between the second accumulator unit 5 and the electric power line $e_C$, so as to be capable of supplying the load 51 or of charging said second accumulator unit 5, said electric power line $e_5$ being capable of supporting the powers $P_3$ and $P_5$.

On the basis of the control action performed by the electronic power control device 8, the electricity generation unit 30 is capable of operating according to one of the following modes:

Mode 1: "from photovoltaic generation unit to load" (FIG. 1A): the photovoltaic generation unit 1 supplies all the electric first power generated $P_1$ to the load 51; the first and the second accumulator unit 20, 5 are not in service; this occurs when the first electric power $P_1$ generated by the photovoltaic generation unit 1 is equivalent to the electric power $P_C$ absorbed by the load 51;

Mode 2: "from photovoltaic generation unit plus almost one of the accumulator units to load" (FIG. 1B): the photovoltaic generation unit 1 supplies all the first electrical power generated $P_1$, and the first and/or the second accumulator unit 20, 5 is also in service to supply the remaining second and third electric power ($P_2$ o $P_3$) to the load; this occurs when the electric power $P_1$ generated by the photovoltaic generation unit 1 is lower than the electric power $P_C$ absorbed by the load 51;

Mode 3: "from photovoltaic generation unit to load plus almost one of the accumulator units": the photovoltaic generation unit 1 supplies all the first electric power generated $P_1$ directly to the load 51 and also supplies power to almost one of the accumulator units 20, 5, which thus stores energy that can be used subsequently, during a further operating step according to mode 2; mode 3 is used when the first electric power $P_1$ generated by the photovoltaic generation unit 1 is greater than the electric power $P_C$ absorbed by the load 51;

Mode 4: "from almost one of the accumulator units to load": the photovoltaic generation unit 1 does not supply power to the load ($P_1$=0), which is therefore supplied by almost one of the accumulator units 20, 5 which supplies power ($P_2$ or $P_3$); mode 4 is used when the photovoltaic generation unit 1 is not able to produce first electric power $P_1$ (for example due to bad weather conditions).

Mode 5: "from fuel cell unit 2 to load plus the accumulator unit 5": the photovoltaic generation unit 1 does not supply power ($P_1$=0) to the load 51 and accumulator unit 5; fuel cell 2 supplies electric power P2 to a load and/or to secondary battery accumulator unit 5.

It is noted that in order to simplify the explanation, the power conversion are assumed as ideal, in the sense that the losses of the various components, which are nonetheless known to those skilled in the art, are not taken into account.

It is also noted that there is a certain degree of versatility and a certain fault tolerance, as up to three electric power generators (photovoltaic generation unit 1, first accumulator unit 20 and second accumulator unit 5) can be used to supply the load 51: therefore, in the event of failure of one of these electric power generators, it is possible to use the other two electric power generators systems.

Surprisingly, it has been noted that an electricity generation unit of this kind (backpack/trolley version) weighs less than 50 kg, in particular: the photovoltaic panel weighs less than 10 kg, the fuel cell generator 2 weighs less than 5 kg, the electrolyzer 4 weighs less than 5 kg, the tank 3 weighs less than 10 kg, the converters 7a and 7b weigh less than 5 kg each, the secondary accumulator unit 5 weighs less than 15 kg, Therefore, as a whole, the electricity generation unit 30 weighs less than 50 kg.

Moreover, the following dimensions of the main components of the electricity generation unit have been noted: the fuel cell generator 2 occupies less than 30 dm$^3$, the electrolyser 4 occupies less than 30 dm$^3$, the converters 7a and 7b occupy less than 10 dm$^3$ each, the secondary accumulator unit 5 occupies less than 10 dm$^3$. Therefore, as a whole the electricity generation unit 30 occupies less than one 80 dm$^3$.

Taking the weights and dimensions described above into account, the transportable electricity generation unit 30 is suitable to supply mobile emergency telecommunication systems (TLC) where there is no connection to the electric network and said transportable electricity generation unit 30 can be transported, for example, by towing.

An electricity generation unit of this kind is capable of supplying a peak power of 500 W, 1500 Wh/day but in other embodiments, it is also possible to reach powers in a range of 100 W-1000 W with different enclosures.

Further uses of the present invention are relative to the electric supply of field medical equipment, lighting systems, land and sea signalling, weather stations or for battery chargers of portable devices or as auxiliary power generation system for watercraft and camping vans. It can also be used for temporary supply of electricity in rural areas or for buildings in isolated areas.

It can also be used for ships, boats or the like, or for camping vans, to supply the various devices increasingly used in these means of transport.

The examples provided in the previous embodiment can be applied to an electricity generation unit of transportable/portable/wearable type, comprising a portable aerogenerator and a primary accumulator unit of electrolyte/fuel cell type, electrically connectable in cascade to said portable aerogenerator. An example of this electricity generation unit can be obtained from the figures, if the photovoltaic generation unit is replaced by an aerogenerator.

The figures are also suitable to illustrate the method for generating direct voltage electric power according to the present invention:
- a first step of generating electric power from photovoltaic and/or wind energy;
- a second step of performing electrolysis using the electric power produced by said first step;
- a third step of storing hydrogen produced during said second step;
- a fourth step of generating further electric power on the basis of a fuel cell type reaction;
- a fifth step of delivering said electric power and/or said further electric power to a load and/or to a secondary battery accumulator unit.

The method according to the present invention also includes the following steps:
- two voltage regulation steps (applied by the static converters 7a, 7b);
- a step of storing energy by a battery type accumulator 5;
- a step of delivering power by said battery type accumulator using the energy stored during the energy storing step;
- a step of controlling the aforesaid steps, for example so as to operate this method according to one of the modes 1, 2, 3, 4 illustrated previously.

The invention claimed is:

1. A transportable electricity generation unit, suitable to supply electric power to an external load, characterized by comprising:
   a photovoltaic generation unit and/or an aerogenerator generating a first electric power;
   a water electrolyzer connected to said photovoltaic generation unit and/or aerogenerator, said electrolyzer being capable of producing hydrogen by electrolysis of water;
   a tank to store the hydrogen deriving from said electrolysis of water;
   a fuel cell unit fed with the hydrogen produced by said electrolyzer or stored in said tank, said fuel cell generating a second electric power, said water electrolyzer and said fuel cell optionally being the same device which operates either as water electrolyzer or as fuel cell;
   an electronic power control device comprising means for controlling the flow of said first electric power and said second electric power to said external load, controlling the flow of said first electric power to said water electrolyzer, and for controlling production and storage of hydrogen;
   wherein said electronic power control device allows at least the following operating modes:
      a first mode according to which said photovoltaic generation unit and/or said aerogenerator supplies all the first electric power generated to an external load;
      a second mode according to which said photovoltaic generation unit and/or said aerogenerator supplies all the first electric power generated to said external load and said fuel cell and/or said secondary accumulator unit supply the remaining second and/or third electric power to said external load;
      a third mode according to which said photovoltaic generation unit and/or said aerogenerator supplies all the first electric power generated directly to said external load and to said water electrolyzer and/or to said secondary battery accumulator unit;
      a fourth mode according to which said fuel cell supply said second electric power and/or said secondary battery accumulator unit supply said third electric power to said external load; and
      a fifth mode according to which said fuel cell supply said second electric power directly to said external load and/or to said secondary battery accumulator load.

2. A transportable electricity generation unit according to claim 1, comprising a secondary battery accumulator unit electrically connected to said fuel cell and to said water electrolyzer, said secondary battery accumulator unit being capable of generating a third electric power and/or storing said first electric power and/or storing said second electric power, said electronic power control device comprising means for controlling the flow of said third electric power to said external load and/or to said water electrolyzer;
   wherein said electronic power control device allows at least the following operating modes:
      a first mode according to which said photovoltaic generation unit and/or said aerogenerator supplies all the first electric power generated to an external load;
      a second mode according to which said photovoltaic generation unit and/or said aerogenerator supplies all the first electric power generated to said external load and said fuel cell and/or said secondary accumulator unit supply the remaining second and/or third electric power to said external load;
      a third mode according to which said photovoltaic generation unit and/or said aerogenerator supplies all the first electric power generated directly to said external load and to said water electrolyzer and/or to said secondary battery accumulator unit;
      a fourth mode according to which said fuel cell supply said second electric power and/or said secondary battery accumulator unit supply said third electric power to said external load; and
      a fifth mode according to which said fuel cell supply said second electric power directly to said external load and/or to said secondary battery accumulator load.

3. A transportable electricity generation unit according to claim 2, wherein at least one of said fuel cell unit and/or said electrolyzer comprises a polymeric membrane.

4. A transportable electricity generation unit according to claim 2, comprising at least a first static DC/DC converter downstream of said photovoltaic generation unit and/or said aerogenerator and a second static DC/DC converter downstream of said fuel cell unit.

5. A transportable electricity generation unit according to claim 2, comprising an enclosure capable of containing at least said water electrolyzer and/or said fuel cell unit and/or said secondary battery accumulator unit, and/or said photovoltaic generation unit and/or said aerogenerator.

6. A transportable electricity generation unit according to claim 1, wherein at least one of said fuel cell unit and/or said electrolyzer comprises a polymeric membrane.

7. A transportable electricity generation unit according to claim 6, comprising at least a first static DC/DC converter downstream of said photovoltaic generation unit and/or said aerogenerator and a second static DC/DC converter downstream of said fuel cell unit.

8. A transportable electricity generation unit according to claim 6, comprising an enclosure capable of containing at least said water electrolyzer and/or said fuel cell unit and/or said secondary battery accumulator unit, and/or said photovoltaic generation unit and/or said aerogenerator.

9. A transportable electricity generation unit according to claim 1, comprising at least a first static DC/DC converter downstream of said photovoltaic generation unit and/or said aerogenerator and a second static DC/DC converter downstream of said fuel cell unit.

10. A transportable electricity generation unit according to claim 9, comprising an enclosure capable of containing at least said water electrolyzer and/or said fuel cell unit and/or said secondary battery accumulator unit, and/or said photovoltaic generation unit and/or said aerogenerator.

11. A transportable electricity generation unit according to claim 1, comprising an enclosure capable of containing at least said water electrolyzer and/or said fuel cell unit and/or said secondary battery accumulator unit, and/or said photovoltaic generation unit and/or said aerogenerator.

12. A transportable electricity generation unit according to claim 11, wherein said enclosure is wearable.

13. A transportable electricity generation unit according to claim 12, comprising a cart provided with wheels, said cart comprising said enclosure.

14. A transportable electricity generation unit according to claim 11, comprising a cart provided with wheels, said cart comprising said enclosure.

15. A transportable electricity generation unit according to claim 1, wherein at least one of said fuel cell unit and/or said electrolyzer comprises a polymeric membrane.

16. A transportable electricity generation unit according to claim 1, comprising at least a first static DC/DC converter downstream of said photovoltaic generation unit and/or said aerogenerator and a second static DC/DC converter downstream of said fuel cell unit.

17. A transportable electricity generation unit according to claim 1, comprising an enclosure capable of containing at least said water electrolyzer and/or said fuel cell unit and/or said secondary battery accumulator unit, and/or said photovoltaic generation unit and/or said aerogenerator.

* * * * *